Patented Mar. 6, 1945

2,371,079

UNITED STATES PATENT OFFICE 2,371,079

CATALYTIC REFORMING

Charles L. Thomas and Jacob Elston Ahlberg, Chicago, Ill., assignors to Universal Oil Products Company, Chicago, Ill., a corporation of Delaware No Drawing. Application March 31, 1941, Serial No. 386,123

3 Claims. (Cl. 196—50)

This application is a continuation-in-part of our co-pending application Serial No. 288,579, filed August 5, 1939, which was a continuation-in-part of our application Serial No. 236,549, filed October 22, 1938, now Patent No. 2,285,314, granted June 2, 1942.

This invention relates to the use of catalysts for accelerating reactions among hydrocarbons, and more specifically, it has reference to a method for selectively promoting reforming of gasoline fractions obtained in thermal cracking and thermal reforming by means of particularly effective refractory catalytic materials characterized by their method of manufacture.

The present invention involves a conversion of olefinic hydrocarbons in the presence of specific catalytic materials which function to selectively isomerize said olefinic hydrocarbons with the resulting increase in the octane number of the motor fuels. The composition of the gasoline fractions obtained in thermal cracking and thermal reforming is quite complex. It cannot be stated with certainty what reactions are responsible for the increase in the octane number when these charging stocks are subjected to the action of a catalyst the preparation of which is hereinafter described. These preferred catalysts are characterized in their effectiveness in isomerizing olefins and in promoting the other reactions which cause an improvement in the motor fuel characteristics of the charging stock with the simultaneous formation of a minimum quantity of carbonaceous deposit, heavy polymers, as well as normally gaseous products. These catalysts are also characterized by their refractory properties which enable them to withstand severe conditions of temperature and pressure to which they are subjected and are further characterized by their ease and simplicity of manufacture and their exact reproducibility.

In one specific embodiment, the present invention comprises the use of catalysts suitable for use in reforming olefinic gasolines, the catalytic material being made by preparing in the primary step a precipitated hydrated silica gel, treating and washing said silica gel with a reactant and water to effect substantially complete removal of alkali metal ions, suspending the purified precipitated silica in a solution of an aluminum salt, removing excess liquid and drying of the composite to remove a major portion of the water content, forming into particles of the desired sizes and calcining the purified catalytic material.

Generally speaking, a purified silica gel is added to a solution of an aluminum salt and the alumina precipitated by hydrolysis, preferably by heating, or the purified silica gel may be thoroughly admixed with a solution of an aluminum salt and heated, whereby alumina will be deposited by the decomposition of said aluminum salt.

We have found that the silica and alumina catalyst which may be prepared by the several alternative methods described in detail in the following paragraphs, are rendered more stable over long periods of use and are also more active and selective in reforming olefinic gasolines when the originally precipitated hydrated silica, which forms a primary material upon which the precipitated alumina is subsequently deposited is substantially freed from alkali metal ions. These alkali metal ions will in the more general methods of preparation be sodium ions inasmuch as the various sodium silicates comprise one of the more readily available raw materials for the manufacture of this type of catalyst. A purification treatment which constitutes one of the main features of our invention is described in detail in one of the later paragraphs. The characteristics and efficiency of the final alumina and silica catalysts will vary more or less in the exact condition of precipitation and/or purification treatment and the ratio of silica to alumina.

In the catalysts thus prepared the ratio of silica to alumina by weight may range from 1 to 1 to 10 to 1 or greater ratios may be used, active catalysts having been prepared in which the ratio is as high as 50 to 1 so that in effect the alumina may be considered to act as a promoter of the catalytic activity of the silica. It is to be recognized that very little is known positively concerning the mechanism of promoter action in catalysis and no attempt will be made herein to offer any definite reason for the observed effect of the addition of varying amounts of alumina to silica. There may be a joint promoter effect or it may be that the alumina is the more active catalyst and is extensively dispersed in and on the silica in order to present a large surface.

An important feature of our invention resides in the fact that catalysts of greatly increased stability and efficiency in the reforming reactions are produced when there is substantially complete exclusion of alkali metal ions from the hydrated alumina-silica masses prior to their drying and calcining to prepare them for service. In the present invention a precipitated hydrated silica gel substantially free from alkali metal ions is used as the primary material or base for the subsequent deposition of hydrated alumina. Silica gel free from alkali metal ions may be prepared by the hydrolysis of silicon tetrachloride, for example, but in the more usual method the hydrated silica gel will be prepared by the acidification of alkali metal silicates, whereby alkali metal ions are unavoidably incorporated into the silica gel which are removed as one feature in the process of our invention. It is not positively known whether the alkali metal compounds, such as those of sodium, are present in chemical combination or in an adsorbed state, but it has been definitely determined that their exclusion or removal is necessary if catalysts of superior activity and stability are to be obtained. It may be considered that the presence of these alkali metal ions may cause a sintering or fusion of the surfaces of the primary composites of the catalytic material at elevated temperatures so that the porosity of the catalyst particles is reduced or altered with a corresponding reduction in effective surface considering the catalytic effects to be due at least in part to surface action. However, such concepts are principally speculative in view of the difficulty of obtaining direct confirmatory evidence.

Several alternative purification methods are applicable to primary hydrated silica gels prepared by the acidification of alkali metal silicate solutions to insure the substantially complete absence of sodium or other alkali metal silicate solutions to insure the substantially complete absence of sodium or other alkali metal ions. One method consists in treating and washing the precipitated silica gel with acidic solutions to extract alkali metal impurities incorporated into the silica gel during its preparation by the formation of corresponding alkali metal salts. Thus a precipitated silica gel may be first washed with water to remove a major portion of the soluble impurities and subsequently treated with a mineral acid, for example, such as hydrochloric acid and water to remove the alkali metal ions. As an alternative purification method the primary precipitated hydrated silica may be treated with ammonium compounds of salts, such as ammonium chloride in solution or other halides, the sulfate, the nitrate, the phosphates, or the acetate, so that alkali metal ions will not be substantially present in the primary gel when it has been suitably washed. Whether the alkali metal ions are present in the hydrated silica gel in a chemically combined or adsorbed condition, the alkali metal ions may be replaced by the ammonium ions which will be later expelled from combination or adsorption in subsequent treatment at elevated temperature.

Another alternative method for removing alkali metal ions from the precipitated hydrated silica gel consists in treating with salts of multivalent metals which may replace the sodium or other alkali metals in the manner similar to that described in the case of ammonium compounds. For example, a primary gel having large amounts of alkali metal compounds present may be treated with a solution of salts of multivalent metals, more particulary aluminum, in which the metal forms the positive ion of the salt being used. In this mode of operation the multivalent used to replace the alkali metal ions is introduced into the catalytic material and is not removed at elevated temperatures as is the ammonium ion above described. Whatsoever the purification method used, purified hydrated primary gels have been prepared by all the methods above described and substantially alkali metal-free alumina has been added with further processing according to the present invention to form catalysts suitable for hydrocarbon reactions.

The weight of evidence at hand on the mechanism leading to the replacement of alkali metals in the primary hydrated gel indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from the base exchange that occurs in the case of zeolites.

After the alumina has been mixed or deposited upon the purified hydrated silica gel and water washed, if desired, it may be recovered as a filter cake and dried at a temperature of the order of 240–300° F., more or less, after which it may be pressed and sized to recover particles of a convenient average size or formed into desired shapes by compression methods. It has been found that after the usual drying treatment the material usually has a total water content of approximately 15 per cent which appears to correspond to the best workability of the material. By calcining the particles at temperatures of the order of 850–1000° F., or higher, maximum activity of the catalyst is obtained and a further dehydration occurs so that, for example, after a period of heating at 900° F. the water content as determined by analysis is of the order of 2 to 3 per cent which does not vary appreciably either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures as high as 1400 to 1600° F. without material loss of catalytic activity.

According to the present process catalysts prepared by the general procedure described in the preceding paragraphs, may be employed as filling material in tubes or chambers in the form of small pellets or granules. In the example given below, the average particle size was within the range of 6 to 10 mesh. These particles may be formed by pilling, briquetting, or extruding, the pilling probably being the preferred method of forming the granules.

The general procedure adopted for the reforming process involves contacting the heated gasoline fraction with the catalyst with the subsequent separation of the small quantities of normally gaseous products formed from the normally liquid hydrocarbons. In some cases it may be desired to remove the small percentage of higher boiling materials formed by polymerization. Whether or not these heavy bottoms are removed depends somewhat on the nature of the charging stock. In some cases the amount of such heavy bottoms is so small that their removal is not necessary. The temperatures used in the reforming process are in general comprised within the approximate limits of 800–1100° F., the space velocity depending upon the temperature being used. Pressures which range from atmospheric to as much as 50 or 100 pounds per square inch may be used. As the pressure is increased, the amount of heavy bottoms formed increases and a preferred method of operation appears to be to simply use a sufficiently high pressure to cause the materials to flow readily through the catalyst bed and into the subsequent separating equipment. When utilizing pressures approximately atmospheric and temperatures of 950° F., space velocities within the range of 5 to 25 volumes of liquid charging stock per hour per unit volume of catalyst, may be used. As the temperature is increased, the space velocities must be increased. For example, at a temperature of 1030° F. a space velocity of 80 may be satisfactorily used.

The following example of preparation of catalyst peculiar to the present invention is given to indicate its novelty and utility although not for the purpose of limiting said invention in the exact agreement with the data introduced.

390 cc. of concentrated hydrochloric acid in 1815 cc. of solution was added to 568.4 grams of sodium silicate ($Na_2SiO_3.9H_2O$) in 300 cc. of water which gave a liquid suspension which was definitely acidic to blue litmus. The filter cake was then slurried in 2½ liters of water and filtered, this washing treatment being repeated several times. The filter cake was slurried in 2½ liters of water after which ⅛ equivalent of hydrochloric acid in 50 cc. of water was added. The precipitate was filtered and this treatment again repeated. The filter cake was slurried in water and water washing treatment repeated 4 times when the wash water was practically free from alkali metal salts. The purified silica was then slurried in 40.24 grams of aluminum chloride hexahydrate dissolved in 400 cc. of water. The excess liquid was then drained by filtration and the filter cake dried at approximately 300° F. The dried material was then pressed and sized into 6–10 mesh particles and subsequently calcined at approximately 932° F.

A charging stock comprising a gasoline obtained by thermally cracking a Pennsylvania gas oil and having the following characteristics, was used as a charge in the reforming operation.

*Charging stock (thermally cracked gasoline)*

| | |
|---|---|
| Gravity A. P. I. at 60° F | 60.2 |
| Reid vapor pressure lbs./sq. inch | 9.8 |
| Octane No. A. S. T. M. motor method | 66.3 |
| 100 ML. distillation: | |
| I. B. P ° F | 93 |
| 5% ° F | 118 |
| 10% ° F | 134 |
| 20% ° F | 165 |
| 30% ° F | 197 |
| 50% ° F | 260 |
| 70% ° F | 314 |
| 90% ° F | 369 |
| 95% ° F | 387 |
| E. P ° F | 399 |

Utilizing a catalyst prepared by the above method, a yield of 97.8 per cent of reformed gasoline having an octane number of 72.9 A. S. T. M. motor method, may be obtained when operating at a temperature of 955° F. at a liquid hourly space velocity corresponding to 15.1 volumes of liquid charging stock per hour per unit volume of catalyst.

We claim as our invention:

1. A process for increasing the octane number of an olefinic gasoline fraction resulting from the thermal conversion of hydrocarbon oil which comprises subjecting said gasoline fraction at a temperature of from 800 to about 1100° F., a pressure of from atmospheric to about 100 pounds per square inch and for a time of contact corresponding to a liquid hourly space velocity of from 5 to about 25 volumes of liquid per unit volume of catalyst to the action of a catalyst prepared by precipitating a silica hydrogel from a solution of an alkali metal silicate by acidification thereof, suspending the hydrogel in a solution of an aluminum salt and precipitating alumina by hydrolysis upon said suspended silica hydrogel, washing the precipitated material and heating to remove a major portion of its water content, and calcining above a temperature of about 850° F.

2. A process for increasing the octane number of an olefinic gasoline fraction resulting from the thermal conversion of hydrocarbon oil which comprises subjecting said fraction at a temperature of from 800 to about 1100° F., a pressure of from atmospheric to about 100 pounds per square inch and for a time of contact corresponding to a liquid hourly space velocity of from 5 to about 25 volumes of liquid per unit volume of catalyst; to contact with a catalyst prepared by commingling a silica hydrogel and a solution of an aluminum salt, precipitating alumina from said solution upon the silica hydrogel by hydrolysis of the aluminum salt, and drying the resultant silica-alumina composite.

3. A process for reforming an olefinic gasoline fraction which comprises subjecting said fraction resulting from the thermal conversion of hydrocarbon oil at a temperature within the approximate limits of 800 to 1100° F. and at a pressure of from substantially atmospheric to about 100 pounds per square inch and for a time of contact corresponding to a space velocity of about 5 to about 25 volumes of liquid per hour per unit volume of catalyst, to the action of a catalyst prepared by the hydrolytic absorption of alumina on a precipitated silica hydrogel, said composite having been substantially freed of alkali metal compounds, dried sufficiently to permit forming into particles of the desired size, and calcined above a temperature of about 850° F.

CHARLES L. THOMAS.
JACOB ELSTON AHLBERG.